(12) United States Patent
Pang et al.

(10) Patent No.: US 12,387,387 B2
(45) Date of Patent: Aug. 12, 2025

(54) PROP PROCESSING METHOD AND APPARATUS BASED ON LIVE ROOM

(71) Applicant: SHANGHAI BILIBILI TECHNOLOGY CO., LTD., Shanghai (CN)

(72) Inventors: Haijiao Pang, Shanghai (CN); Yao Wang, Shanghai (CN); Zhen Liu, Shanghai (CN); Hong Hu, Shanghai (CN); Wenlong Zhang, Shanghai (CN); Ming Xu, Shanghai (CN); Min Ye, Shanghai (CN); Yong Zhou, Shanghai (CN); Fan Zhang, Shanghai (CN); Xian Lin, Shanghai (CN); Lili Hu, Shanghai (CN); Yongjian Zhou, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 249 days.

(21) Appl. No.: 18/144,005

(22) Filed: May 5, 2023

(65) Prior Publication Data
US 2023/0360281 A1    Nov. 9, 2023

(30) Foreign Application Priority Data
May 6, 2022    (CN) .......................... 202210485981.8

(51) Int. Cl.
| G06T 11/00 | (2006.01) |
| G06T 13/00 | (2011.01) |
| H04L 65/611 | (2022.01) |

(52) U.S. Cl.
CPC .............. *G06T 11/00* (2013.01); *G06T 13/00* (2013.01); *H04L 65/611* (2022.05)

(58) Field of Classification Search
CPC ....... G06T 11/00; G06T 13/00; H04L 65/611; H04N 21/2187; H04N 21/44008; H04N 21/47205; H04N 21/4784; H04N 21/4788
See application file for complete search history.

(56) References Cited

U.S. PATENT DOCUMENTS

| 2019/0158289 | A1* | 5/2019 | Drouin | ................. H04L 9/3239 |
| 2021/0044640 | A1* | 2/2021 | He | ......................... G10L 15/26 |
| 2021/0192820 | A1* | 6/2021 | Zhu | ........................ G06F 16/44 |
| 2021/0264444 | A1* | 8/2021 | Chen | ....................... G06T 11/00 |
| 2022/0067984 | A1* | 3/2022 | Choi | ........................ A63F 13/42 |
| 2023/0004627 | A1* | 1/2023 | Holland | .................. G06F 21/44 |

(Continued)

*Primary Examiner* — Kee M Tung
*Assistant Examiner* — Nauman U Ahmad
(74) *Attorney, Agent, or Firm* — BakerHostetler (57) ABSTRACT

This application provides techniques of generating non-fungible token props to be displayed in live rooms. The techniques comprise determining a virtual prop associated with one of a plurality of live rooms in which an online streamer performs livestreaming; determining a set of material components of the virtual prop; generating a set of visual materials based on configuring a plurality of visual materials for each of the set of material components; and generating a set of non-fungible token props corresponding to the virtual prop based on a plurality of sets of visual materials corresponding to the set of material components, wherein an identifier is assigned to each of the set of non-fungible token props for identification.

19 Claims, 4 Drawing Sheets

(56) References Cited

U.S. PATENT DOCUMENTS

| | | | |
|---|---|---|---|
| 2023/0098615 A1* | 3/2023 | Advani | H04L 63/00 713/193 |
| 2023/0230075 A1* | 7/2023 | Aiello | H04L 63/102 705/75 |
| 2023/0302364 A1* | 9/2023 | Rodriguez | A63F 13/812 |

* cited by examiner

PROP PROCESSING METHOD AND APPARATUS BASED ON LIVE ROOM

CROSS-REFERENCE TO RELATED APPLICATION

The present application claims priority to Chinese Patent Application No. 202210485981.8, filed on May 6, 2022, which is incorporated herein by reference in its entirety.

BACKGROUND

With development of Internet technologies, livestreaming has also been greatly developed. When watching livestreaming, an audience also gives a gift to an online streamer. However, at present, a live room gift includes only a common gift type, and gifts sent by users are the same. The gift is lack of uniqueness and rareness. Consequently, the user is lack of a value awareness of the gift, and is lack of gift interaction enthusiasm.

SUMMARY

In view of this, embodiments of this application provide a prop processing method based on a live room. This application also relates to a prop processing apparatus based on a live room, a computing device, and a computer-readable storage medium, to resolve a problem in a conventional technology that a method for displaying a prop in a live room is single and user experience is poor.

According to a first aspect of the embodiments of this application, a prop processing method based on a live room is provided, applied to a server and including:
  determining a to-be-processed prop in a live room and a material component set corresponding to the to-be-processed prop;
  configuring a preset quantity of visual materials for each material component in the material component set to generate a visual material set; and
  generating a non-fungible token prop set corresponding to the to-be-processed prop based on a visual material corresponding to each material component.

According to a second aspect of the embodiments of this application, a prop processing method based on a live room is provided, applied to a live room terminal and including:
  receiving a visual material set and a to-be-displayed visual material identifier set of a target non-fungible token prop, where the to-be-displayed visual material identifier set includes at least one to-be-displayed visual material identifier;
  determining a to-be-displayed visual material corresponding to each to-be-displayed visual material identifier from the visual material set;
  synthesizing the target non-fungible token prop based on each to-be-displayed visual material; and
  displaying the target non-fungible token prop.

According to a third aspect of the embodiments of this application, a prop processing apparatus based on a live room is provided, applied to a server and including:
  a determining module, configured to determine a to-be-processed prop in a live room and a material component set corresponding to the to-be-processed prop;
  a configuration module, configured to configure a preset quantity of visual materials for each material component in the material component set to generate a visual material set; and
  a generation module, configured to generate a non-fungible token prop set corresponding to the to-be-processed prop based on a visual material corresponding to each material component.

According to a fourth aspect of the embodiments of this application, a prop processing apparatus based on a live room is provided, applied to a live room terminal and including:
  a set receiving module, configured to receive a visual material set and a to-be-displayed visual material identifier set of a target non-fungible token prop, where the to-be-displayed visual material identifier set includes at least one to-be-displayed visual material identifier;
  a material determining module, configured to determine a to-be-displayed visual material corresponding to each to-be-displayed visual material identifier from the visual material set;
  a prop synthesis module, configured to synthesize the target non-fungible token prop based on each to-be-displayed visual material; and
  a prop display module, configured to display the target non-fungible token prop.

According to a fifth aspect of the embodiments of this application, a computing device is provided, including a memory, a processor, and computer instructions stored in the memory and capable of running on the processor, where when executing the computer instructions, the processor implements steps of the prop processing method based on a live room.

According to a sixth aspect of the embodiments of this application, a computer-readable storage medium is provided, where the computer-readable storage medium stores computer instructions, and when the computer instructions are executed by a processor, steps of the prop processing method based on a live room are implemented.

The prop processing method based on a live room provided in this application is applied to the server, and includes: determining the to-be-processed prop in the live room and the material component set corresponding to the to-be-processed prop; configuring the preset quantity of visual materials for each material component in the material component set to generate the visual material set; and generating the non-fungible token prop set corresponding to the to-be-processed prop based on the visual material corresponding to each material component. In the method provided in this application, an NFT gift corresponding to a live room gift is added, so that an audience watching livestreaming can have an identity consensus and a value awareness of gift rareness, to improve diversity of giving props in the live room and interaction enthusiasm of the audience. This improves user experience.

DESCRIPTION OF EMBODIMENTS

Many specific details are described in the following descriptions to facilitate full understanding of this application. However, this application can be implemented in many other manners different from those described herein. A person skilled in the art may make similar promotion without departing from the connotation of this application. Therefore, this application is not limited to the specific implementations disclosed below.

Terms used in one or more embodiments of this application are merely used to describe specific embodiments, but are not intended to limit the one or more embodiments of this application. The terms "a" and "the" of singular forms used in one or more embodiments and the appended claims of this application are also intended to include plural forms, unless otherwise specified in the context clearly. It should also be understood that, the term "and/or" used in one or more embodiments of this specification indicates and includes any or all possible combinations of one or more associated listed items.

It should be understood that although terms such as "first" and "second" may be used in one or more embodiments of this application to describe various types of information, the information is not limited to these terms. These terms are merely used to differentiate between information of the same type. For example, without departing from the scope of one or more embodiments of this application, "first" may also be referred to as "second", and similarly, "second" may also be referred to as "first". Depending on the context, for example, the word "if" used herein may be explained as "while", "when", or "in response to determining".

First, nouns related to one or more embodiments of this application are explained.

A non-fungible token (NFT) is an entry of a blockchain. The NFT can represent a unique thing. Any NFT item is unique.

This application provides a prop processing method based on a live room. This application also relates to a prop processing apparatus based on a live room, a computing device, and a computer-readable storage medium. Details are described one by one in the following embodiments.

Figure 1:
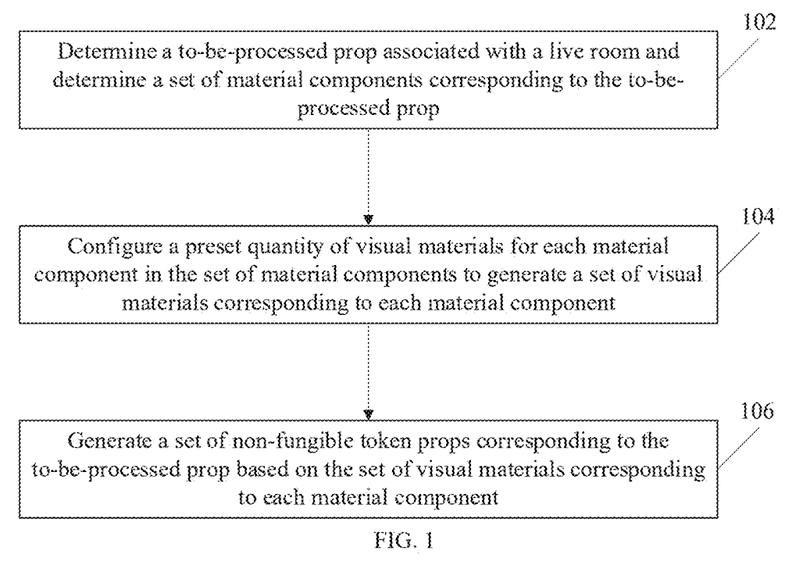
FIG. 1 is a flowchart of a first prop processing method based on a live room according to an embodiment of this application.

FIG. 1 is a flowchart of a prop processing method based on a live room according to an embodiment of this application. The method is applied to a server computing system, and specifically includes the following steps.

Step 102: Determine a to-be-processed prop associated with one of a plurality of live rooms and determining a set of material components (i.e., a material component set) corresponding to the to-be-processed prop.

The live room is a virtual room in which an online streamer performs livestreaming in a live scenario. A user may enter the live room to watch the online streamer performing livestreaming, and may send a virtual prop to the online streamer in the live room. A virtual prop displayed in the live room is preconfigured by a technical person. Currently, virtual props in the live room are all common props, and a display manner of each prop is fixed and is lack of uniqueness. Based on this, this application provides an NFT prop. A non-fungible token (NFT) is an entry of a blockchain. The NFT can represent a unique thing. Any NFT item is unique.

Specifically, the to-be-processed prop is a prop on which NFT conversion needs to be performed. In actual application, the to-be-processed prop is generally a virtual prop that needs to include at least one material component. After the to-be-processed prop is determined, a material component corresponding to the to-be-processed prop may be determined.

Figure 2:
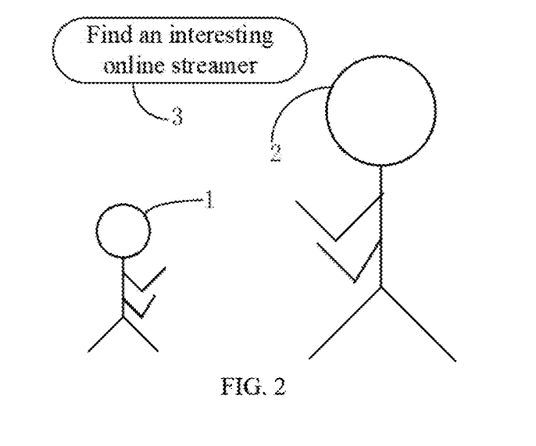
FIG. 2 is a schematic diagram of a to-be-processed prop according to an embodiment of this application.

For example, a prop includes a cartoon image, and a hairstyle, clothes, and headwear of the cartoon image may be used as material components of the prop. For another example, a prop includes two cartoon images and one text box, and the two cartoon images and the text box may be used as material components of the prop. FIG. 2 is a schematic diagram of a to-be-processed prop according to an embodiment of this application. As shown in FIG. 2, the to-be-processed prop is a Kua Kua prop, and the Kua Kua prop includes three material components: a left small person, a right small person, and a bullet-screen comment box.

Step 104: Configure a preset quantity of visual materials for each material component in the set of material components to generate a set of visual materials (i.e., a visual material set) corresponding to each material component.

The visual material is specifically a presentation form that may be specifically displayed by each material component. In actual application, to reflect personalization, the technical person may configure the preset quantity of visual materials for each material component. For example, one cartoon image is used as an example. The cartoon image includes three material components: a hairstyle, clothes, and a headwear. Five sets of visual materials are designed for each material component, that is, five types of hairstyles, five types of clothes, and five types of headwear are designed. It should be noted that quantities of visual materials configured for all the material components may be the same or different. For example, the foregoing cartoon image may be designed with five types of hairstyles, ten types of clothes, and seven types of headwear. In actual application, to distinguish between all visual materials, a corresponding visual material identifier may be further configured for each type of hairstyle. Five types of hairstyles may be as an example. The five types of hairstyles may be identified as a hairstyle 1, a hairstyle 2, a hairstyle 3, a hairstyle 4, and a hairstyle 5.

In a specific implementation provided in this application, referring to FIG. 2, the Kua Kua prop includes three material components: a left small person, a right small person, and a bullet-screen comment box. Ten visual materials are configured for the left small person, and ten visual materials are configured for the right small person, and ten visual materials are configured for the bullet-screen comment box, to generate a total of three visual material sets.

Step 106: Generate a set of non-fungible token props (i.e., a non-fungible token prop set) corresponding to the to-be-processed prop based on the set of visual materials corresponding to each material component.

The to-be-processed prop is generated by using the material component set. Therefore, one visual material may be selected from the visual material corresponding to each material component to generate one non-fungible token prop (NFT prop). Because each visual material has a unique identifier, the generated NFT prop also has a unique identifier. The foregoing cartoon image is used as an example. The cartoon image includes three material components: a hairstyle, clothes, and headwear. The hair material component includes five types of visual materials, the clothes material component includes ten types of visual materials, and the headwear material component includes seven types of visual materials. One NFT prop corresponding to the cartoon image is generated by randomly selecting one visual material from each material component, and a total of 5*10*7=350 NFT props may be generated. Therefore, an NFT prop set corresponding to the cartoon image may be generated. The NFT prop set includes 350 NFT props in total, presentation forms of the NFT props are different, and each NFT prop has a unique NFT prop identifier.

In the embodiment provided in this application, referring to FIG. 2, one visual material is extracted from each of a total of three visual material sets to generate one NFT Kua Kua prop, and each of the three visual material sets includes ten visual materials. Therefore, a total of 1000 NFT Kua Kua props may be generated, to form an NFT Kua Kua prop set.

In actual application, because the NFT prop is unique, the NFT prop may further be bound to a user identifier. Based on this, in another specific implementation provided in this application, the method further includes:

creating a non-fungible token prop allocation table, where the non-fungible token prop allocation table is used to record a correspondence between a non-fungible token prop identifier and a user identifier.

Referring to the following Table 1, the non-fungible token prop allocation table may be understood as a record table used to record a correspondence between an NFT prop identifier and a user identifier.

TABLE 1

| NFT prop identifier | User identifier |
|---|---|
| NFT prop 1 | User 1 |
| NFT prop 2 | Null |
| NFT prop 3 | User 3 |
| ... | |
| NFT prop n | Null |

Table 1 shows a form of an NFT prop allocation table provided in an embodiment of this application. In actual application, there are a plurality of forms of presenting the NFT prop allocation table, which may be a data table in a database, an Excel table, a log file, and the like. A specific form of presenting the NFT prop allocation table is not limited in this application. Referring to Table 1, the NFT prop identifier column records all NFT prop identifiers in an NFT prop set, and the user identifier column records whether an NFT prop has been obtained by a user. For example, if the NFT prop 1 is bound to the user 1, it indicates that the NFT prop 1 has been obtained by the user 1. For another example, if a user identifier following the NFT prop 2 is null, it indicates that the NFT prop 2 is not obtained by a user.

It should be noted that, in actual application, the NFT prop allocation table may further record only an NFT prop identifier to which a user identifier has been allocated. When no user is allocated to an NFT prop, the NFT prop may not be recorded in the NFT prop allocation table. A specific record manner of the NFT prop allocation table is subject to actual application. The NFT prop allocation table may record an NFT prop of only one virtual prop or NFT props of a plurality of virtual props. Preferably, one NFT prop allocation table may be allocated to each virtual prop.

Because the NFT prop is unique, after the NFT prop set is obtained, the NFT prop may further be allocated to the user based on an obtaining instruction of the user. Specifically, the method further includes:

receiving a prop obtaining instruction, where the prop obtaining instruction carries a to-be-allocated user identifier;

determining a to-be-allocated prop identifier set from the non-fungible token prop allocation table in response to the prop obtaining instruction, where the to-be-allocated prop identifier includes a non-fungible token prop identifier that is not bound to a user identifier; and determining a target to-be-allocated prop identifier from the to-be-allocated prop identifier set, and correspondingly storing the target to-be-allocated prop identifier and the to-be-allocated user identifier into the non-fungible token prop allocation table.

The prop obtaining instruction is specifically a prop obtaining instruction sent by the user to obtain the NFT prop. In actual application, the user may send the prop obtaining instruction of the NFT prop to the server in a plurality of manners, for example, the user consumes a quantity of resources (for example, game coins) in the live room to directly obtain the NFT prop, or may obtain the NFT prop in the live room in a lottery manner.

The prop obtaining instruction carries the to-be-allocated user identifier. The to-be-allocated user identifier is specifically a user identifier for sending the prop obtaining instruction. For example, if a user Zhang San sends the prop obtaining instruction, the to-be-allocated user identifier is Zhang San.

After receiving the prop obtaining instruction, the server determines the to-be-allocated prop identifier set from the NFT prop allocation table. Specifically, the to-be-allocated prop identifier is an NFT prop identifier to which no user identifier is allocated and that is not bound to a user identifier, for example, the NFT prop 2 and the NFT prop n in the foregoing Table 1. It should be noted that an NFT prop identifier that has been bound to a user identifier cannot be allocated again.

After the to-be-allocated prop identifier set is obtained, a target to-be-allocated prop identifier is randomly selected from the to-be-allocated prop identifier set based on a random algorithm, and the target to-be-allocated prop identifier and the to-be-allocated user identifier are bound and stored into the non-fungible token prop allocation table. For example, referring to the foregoing Table 1, the NFT prop 2 selected from the to-be-allocated prop identifier set is used as an example. If the to-be-allocated user identifier is a user 7, the user 7 is recorded in the user identifier corresponding to the NFT prop 2 in the non-fungible token prop allocation table, to indicate that the NFT prop 2 is bound to the user 7, that is, the user 7 owns the NFT prop 2.

In actual application, a quantity of NFT props is limited. Therefore, to enable more users to own NFT props and improve user experience, a quantity of same NFT props owned by each user may be further set. Specifically, before the determining a to-be-allocated prop identifier set from the non-fungible token prop allocation table in response to the prop obtaining instruction, the method further includes:

determining a quantity of props corresponding to the to-be-allocated user identifier from the non-fungible token prop allocation table; and when the quantity of props is less than a preset threshold, executing the operation of determining a to-be-allocated prop identifier set from the non-fungible token prop allocation table in response to the prop obtaining instruction; or when the quantity of props is greater than or equal to the preset threshold, feeding back prompt information indicating that a quantity of non-fungible token props reaches an upper limit.

Before the to-be-allocated prop identifier set is determined, the quantity of NFT props corresponding to the to-be-allocated user identifier is determined by searching the NFT prop allocation table based on the to-be-allocated user identifier, and then it is determined, based on the quantity of the NFT props owned by the user identifier, whether to continue to allocate a new NFT prop to the user identifier. If the quantity of props is less than the preset threshold, an NFT prop may be allocated to the user identifier. If the quantity of props is greater than or equal to the preset threshold, the prompt information is sent to the user, and the prompt information is used to notify the user that the quantity of NFT props owned by the user reaches the upper limit.

In a specific implementation provided in this application, for example, the preset threshold is 5. For a same virtual prop, one user can own a maximum of five NFT props. A user Zhang San sends the prop obtaining instruction. The server searches the NFT prop allocation table based on the user identifier "Zhang San" to determine a prop quantity of NFT props corresponding to the prop owned by Zhang San. If the quantity of props is 4, the operation of determining a to-be-allocated prop identifier set from the NFT prop allocation table may be performed. If the quantity of props is 5, that is, is equal to the preset threshold, the prompt information is sent to the user to prompt the user that the quantity of NFT props owned by the user is 5 and the user cannot obtain the prop any longer.

Still further, because the NFT prop is unique, the user may be dissatisfied with the obtained NFT prop due to a design of the visual material and personal aesthetic value of the user, and expects to obtain another style of NFT prop. However, the quantity of NFT props owned by the user has reached the upper limit. Alternatively, the user expects to give an NFT prop to another user. Based on this, the method provided in this application further includes:

receiving a prop transfer instruction, where the prop transfer instruction carries a to-be-transferred prop identifier, a user identifier before transfer, and a user identifier after transfer; and when determining that the to-be-transferred prop identifier and the user identifier before transfer are correspondingly stored in the non-fungible token prop allocation table, updating the user identifier before transfer to the user identifier after transfer.

The prop transfer instruction is specifically an instruction sent by an owner of an NFT prop to transfer the NFT prop owned by the owner. The prop transfer instruction carries the to-be-transferred prop identifier, the user identifier before transfer, and the user identifier after transfer. Specifically, the to-be-transferred prop identifier is specifically an NFT prop that needs to be transferred. The user identifier before transfer is a user identifier of a current owner of the NFT prop. The user identifier after transfer is a user identifier of a user to which the NFT prop needs to be transferred. For example, if Zhang San owns an NFT prop 1, and Zhang San expects to send the NFT prop 1 to Li Si, Zhang San sends a prop transfer instruction. In the prop transfer instruction, the NFT prop 1 is the to-be-transferred prop identifier, Zhang San is the user identifier before transfer, and Li Si is the user identifier after transfer.

After the prop transfer instruction is received, the non-fungible token prop allocation table is searched based on the to-be-transferred prop identifier and the user identifier before transfer, and when it is determined that the to-be-transferred prop identifier and the user identifier before transfer are correspondingly stored, the user identifier before transfer is updated to the user identifier after transfer, so that NFT prop transfer is completed.

It should be noted that, before a new NFT prop is received, the user identifier after transfer also needs to determine a quantity of NFT props owned by the user identifier after transfer. When the quantity of NFT props corresponding to the user identifier after transfer is equal to a preset threshold, the user identifier after transfer cannot obtain the new NFT prop.

In a specific scenario provided in this application, after obtaining the NFT prop, the user may send the NFT prop when watching livestreaming, and display the NFT prop in the live room. Specifically, the method further includes:

receiving a prop display instruction, where the prop display instruction carries a to-be-displayed non-fungible token prop identifier and a live room identifier;

determining a to-be-displayed non-fungible token prop based on the to-be-displayed non-fungible token prop identifier, and determining a live room based on the live room identifier; and sending the to-be-displayed non-fungible token prop to one or more client computing devices associated with the live room.

The prop display instruction is specifically sent by an NFT prop owner, and the prop display instruction carries the to-be-displayed non-fungible token prop identifier and the live room identifier. In this case, the user is in a live room. Therefore, the NFT prop may be displayed in the live room.

Further, the to-be-displayed non-fungible token prop may be determined based on the to-be-displayed non-fungible token prop identifier, and the client computing devices associated with users who are watching livestreaming in the live room (i.e., client computing devices associated with the live room) may be determined based on the live room identifier. The to-be-displayed non-fungible token prop is sent to each live room terminal for playing. Therefore, an audience watching the live room can watch a play animation of the to-be-displayed non-fungible token prop. Because each non-fungible token prop is unique and has an identifier, user experience of a person sending a prop can be improved, and the user's enthusiasm for sending the NFT prop can be improved.

The to-be-displayed non-fungible token prop includes a plurality of material components. When the to-be-displayed non-fungible token prop is sent to the client computing devices associated with the live room (i.e., live room terminal), a corresponding visual material identifier may be determined on the server side based on the to-be-displayed non-fungible token prop identifier, the to-be-displayed non-fungible token prop is synthesized, and the to-be-displayed non-fungible token prop is sent to the live room terminal. The to-be-displayed non-fungible token prop may be in a video format (such as an MP4 format) and an animation format (such as a scalable vector graphics animation (SVGA) format). In this case, each to-be-displayed non-fungible token prop needs to be synthesized in advance on the server side. When there is a large quantity of visual material sets corresponding to a virtual prop, pressure of the server is high. Based on this, a manner of synthesizing the to-be-displayed non-fungible token prop by the live room terminal may also be used.

Specifically, the sending the to-be-displayed non-fungible token prop to the live room terminal includes:

obtaining a to-be-displayed visual material identifier set of the to-be-displayed non-fungible token prop; and sending the to-be-displayed visual material identifier set to the live room terminal.

In actual application, the visual material set is sent to each live room terminal in advance. When the to-be-displayed non-fungible token prop needs to be sent to the live room terminal, a corresponding to-be-displayed visual material identifier set is determined based on the to-be-displayed non-fungible token prop, and the to-be-displayed visual material identifier set is sent to the live room terminal, so that the live room terminal can determine the to-be-displayed visual material from the visual material set based on the to-be-displayed visual material identifier set, and synthesize the to-be-displayed non-fungible token prop.

In a specific implementation provided in this application, FIG. 2 is still used as an example. The Kua Kua prop includes three material components. Three visual material sets are sent to each live terminal in advance, and a prop display instruction sent by the user is received. An NFT prop identifier is carried in the prop display instruction, and a to-be-displayed visual material identifier set corresponding to the NFT prop identifier includes a left small person 1, a right small person 2, and a bullet-screen comment box 3. The to-be-displayed visual material identifier set is sent to each live room terminal. On each live room terminal, a corresponding left small person visual material 1 is found in a left small person visual material set based on the left small person 1, a corresponding right small person visual material 2 is found in a right small person visual material set based on the right small person 2, and a corresponding bullet-screen comment box visual material 3 is found in a bullet-screen comment box visual material set based on the bullet-screen comment box 3. The left small person visual material 1, the right small person visual material 2, and the bullet-screen comment visual material 3 are spliced to generate the NFT prop.

It should be noted that, in actual application, a manner of sending the to-be-displayed NFT prop from the server to the live room terminal and a manner of sending the to-be-displayed visual material identifier set to the live room terminal may be used separately or together. This is not limited in this application.

In another specific implementation provided in this application, corresponding use duration may be further set for each NFT prop, to further specify a use period of each NFT prop. Correspondingly, after the receiving a prop display instruction, the method further includes:

determining use duration of the to-be-displayed non-fungible token prop based on the to-be-displayed non-fungible token prop identifier; and when the use duration is greater than or equal to a preset duration threshold, performing the operation of determining a to-be-displayed non-fungible token prop based on the to-be-displayed non-fungible token prop identifier, and determining a live room terminal based on the live room identifier; or when the use duration is less than the preset duration threshold, feeding back prop display expiration prompt information.

The use duration is specifically remaining duration in which the to-be-displayed non-fungible token prop may be used. In actual application, corresponding use duration of each NFT prop may be set, and a period in which the prop may be used is 1 year, half a year, or the like. This is not limited in this application. When the use duration is less than the preset duration threshold, the user cannot use the NFT prop in the live room. The user can use the NFT prop only when the use duration is greater than or equal to the preset duration threshold. For example, the user obtains an NFT prop, remaining use duration of the NFT prop is 366 days, and the preset duration threshold is 0 days. When the user duration of the NFT prop is 0 minutes and 0 seconds, the user cannot use the NFT prop any longer, and the NFT prop is only used for collection. When the user sends the NFT prop, a prop display expiration prompt is sent to the user.

It should be noted that, if the NFT prop is transferred, the use duration of the NFT prop does not change, that is, the use duration of the NFT prop is related to the NFT prop, and is not related to the user.

In a specific implementation provided in this application, rareness may further be configured for each NFT prop. Optionally, the method further includes:

configuring a material rareness weight value for the visual material corresponding to each material component; and determining a prop rareness weight value of each non-fungible token prop based on a material rareness weight value of a visual material corresponding to the non-fungible token prop.

In actual application, the technical person configures the material rareness weight value for the visual material corresponding to each material component. For example, for a material component, a material rareness weight value may be configured for each visual material corresponding to the material component. If the material rareness weight value is lower, it indicates that it is more difficult to obtain the visual material. If the material rareness weight value is higher, it indicates that it is easier to obtain the visual material.

Correspondingly, the prop rareness weight value of each NFT prop may be determined based on the material rareness weight value of the visual material corresponding to the NFT prop. If the prop rareness weight value is lower, it indicates that it is more difficult to obtain the NFT prop. If the prop rareness weight value is higher, it indicates that it is easier to obtain the NFT prop.

The prop rareness value is set for the NFT prop, so that the audience's identity consensus can be enhanced, and generates a value awareness of rareness of the NFT prop.

The prop processing method based on a live room provided in this application is applied to the server, and includes: determining the to-be-processed prop in the live room and the material component set corresponding to the to-be-processed prop; configuring the preset quantity of visual materials for each material component in the material component set to generate the visual material set; and generating the non-fungible token prop set corresponding to the to-be-processed prop based on the visual material corresponding to each material component. In the method provided in this application, an NFT gift corresponding to a live room gift is added, so that an audience watching livestreaming can have an identity consensus and a value awareness of gift rareness, to improve diversity of giving props in the live room and interaction enthusiasm of the audience. This improves user experience.

Figure 3:
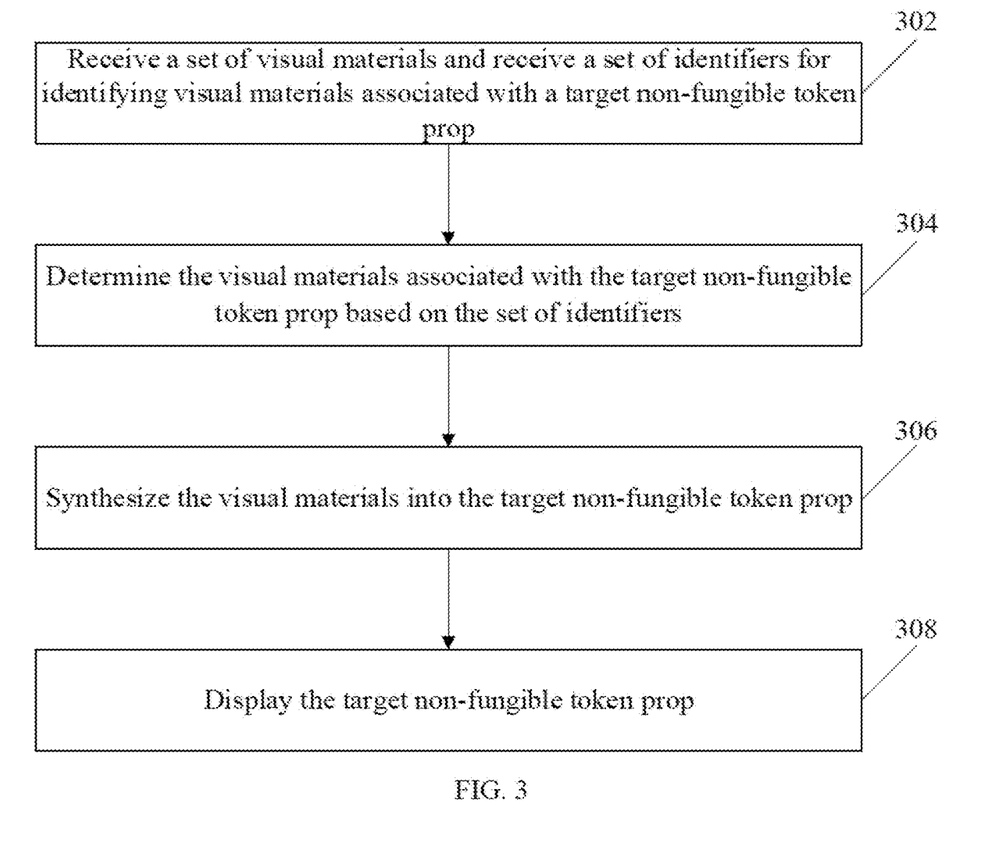
FIG. 3 is a flowchart of a second prop processing method based on a live room according to an embodiment of this application.

FIG. 3 is a flowchart of a prop processing method based on a live room according to an embodiment of this application. The method is applied to a live room terminal, and specifically includes the following steps.

Step 302: Receive a set of visual materials (i.e., a visual material set) and receive a set of identifiers for identifying visual materials (i.e., a to-be-displayed visual material identifier set) associated with a target non-fungible token prop.

The to-be-displayed visual material identifier set includes at least one to-be-displayed visual material identifier.

In actual application, a user watches live content in a live room by using a live room terminal. When the user owns a non-fungible token prop (NFT prop), the user may send the non-fungible token prop (NFT prop) to the live room. When another user sends a non-fungible token prop (NFT prop) in the live room, the non-fungible token prop (NFT prop) may also be displayed in the terminal of the user.

A visual material set of an NFT prop is a visual material set that is configured in advance by a technical person for each material component in the NFT prop. When entering a live platform or the live room, the user may obtain the visual material set of the target non-fungible token prop from a server in advance, that is, download the visual material set of the target non-fungible token prop from the server.

The target NFT prop includes a plurality of material components. The to-be-displayed visual material identifier set is specifically a set of to-be-displayed visual material identifiers corresponding to each material component in the target NFT prop. In the live room terminal, if the user sends a non-fungible token prop, or another user sends a non-fungible token prop, the non-fungible token prop is displayed in the live room. In this case, a to-be-displayed visual material set and a to-be-displayed visual material identifier set corresponding to the non-fungible token prop need to be downloaded in advance.

In a specific implementation provided in this application, an example in which the target NFT prop includes three material components: a left small person, a right small person, and a bullet-screen comment box is used. Each material component includes ten visual materials. In this case, the visual material set includes a total of thirty visual materials. The left small person material component includes ten visual materials, the right small person material component includes ten visual materials, and the bullet-screen comment box material component includes ten visual materials. The to-be-displayed visual material identifier set includes a left small person 1, a right small person 2, and a bullet-screen comment box 3.

Step 304: Determine a visual material corresponding to each visual material identifier from the visual material set.

After the to-be-displayed visual material identifier set is obtained, the to-be-displayed visual material corresponding to each to-be-displayed visual material identifier may be found in the to-be-displayed visual material set.

In a specific implementation provided in this application, the foregoing example is still used. It is determined, from the visual material set based on the to-be-displayed visual material identifier set (left small person 1, right small person 2, and bullet-screen comment box 3), that a to-be-displayed visual material corresponding to the to-be-displayed visual material identifier (left small person 1) is "left small person 1", a to-be-displayed visual material corresponding to the to-be-displayed visual material identifier (right small person 2) is "right small person 2", and a to-be-displayed visual material corresponding to the to-be-displayed visual material identifier (bullet-screen comment box 3) is "bullet-screen comment box 3".

Step 306: Synthesize the target non-fungible token prop based on each to-be-displayed visual material.

After each to-be-displayed visual material is obtained, the target NFT prop may be synthesized based on each to-be-displayed visual material.

The foregoing example is still used. The to-be-displayed visual materials are respectively "left small person 1", "right small person 2", and "bullet-screen comment box 3", and the to-be-displayed visual materials are combined to obtain a corresponding NFT prop.

Step 308: Display the target non-fungible token prop.

After the NFT prop is synthesized in the live room terminal, the NFT prop can be displayed in the live room of the live room terminal, and the user can watch the NFT prop in the live room.

In another specific implementation provided in this application, the method further includes:
generating and playing a display animation of the target non-fungible token prop.

The display animation is an animation effect played when the target NFT prop is displayed. In actual application, when the target NFT prop is displayed in the live room, the corresponding display animation is further generated, and the display animation is played while the NFT prop is displayed in the live room. This improves watching experience of the user.

In another specific implementation provided in this application, the method further includes:
receiving a gift sending instruction for a target gift in a live room;
determining a prop type based on a preset prop obtaining probability; and
when the prop type is a non-fungible token prop type, obtaining a non-fungible token prop corresponding to a target prop.

The target gift is specifically a gift that is sent by the user to an online streamer the live room. In actual application, the target gift may be the to-be-processed prop mentioned in the foregoing embodiment, or may be a gift other than the to-be-processed prop. This is not limited in this application. Sending the target gift needs to consume virtual resources in a first user terminal. The virtual resource may be a game coin, a token, or the like. When the user consumes a quantity of virtual resources corresponding to the target gift, the user may send the target gift to the online streamer. The user may send the target gift to the online streamer in the live room, and a live room client receives the gift sending instruction sent by the user for the target gift.

After the gift sending instruction is received, a probability of obtaining a prop type triggered by a current instruction for giving the target gift may be determined based on the preset prop obtaining probability, and a prop type of the prop currently obtained is determined based on the probability. In actual application, the prop type includes a non-fungible token prop and a common prop, that is, in a process of sending the target gift, the user has the preset prop obtaining probability to obtain an NFT prop. When the determined prop type is a common prop, a common target prop is obtained. When the determined prop type is a non-fungible token prop, an NFT prop corresponding to the target prop may be obtained.

In another specific implementation provided in this application, the method further includes:
counting a quantity of sending times of the target gift; and
when the quantity of sending times is greater than a preset quantity threshold, sending a prop obtaining instruction for the target non-fungible token prop to a server.

In actual application, the quantity of sending times the user sends the target gift is generally counted. When the quantity of sending times reaches the preset quantity threshold, the prop obtaining instruction for the NFT prop may be triggered. It should be noted that, in a process of sending a gift, when the NFT prop is obtained based on the preset prop obtaining probability, the quantity of sending times of the target gift is not reset. To be specific, whether the NFT prop is obtained is not necessarily related to the quantity of sending times of the target gift, and the NFT prop and the quantity of sending times of the target gift are mutually independent. After the quantity of sending times of the target gift is counted, if the quantity of sending times reaches the preset quantity threshold, the prop obtaining instruction for the NFT prop is triggered to be sent to the server once.

In a specific implementation provided in this application, the user sends the target gift to the online streamer in the live room, and determines, based on the preset prop obtaining probability, the prop type corresponding to the current gift sending behavior. When the prop type is the NFT prop, the user may send the prop obtaining instruction for the target non-fungible token prop to the server, to allocate the NFT prop to the user. In addition, the quantity of sending times the user sends the target gift is recorded. If the quantity of sending times is greater than the preset threshold, the prop obtaining instruction for the target non-fungible token prop may be further sent to the server again, to allocate the NFT prop to the user.

In another specific implementation provided in this application, the method further includes:

receiving a prop sending instruction for the non-fungible token prop;

displaying a prop list of the non-fungible token prop in response to the prop sending instruction; and receiving a prop display instruction for a to-be-displayed non-fungible token prop in the prop list, and sending the prop sending instruction to a server, where the prop display instruction carries a to-be-displayed non-fungible token prop identifier and a live room identifier.

Specifically, in a process in which the user watches livestreaming by using the live room terminal, the user may send the NFT prop to the online streamer, that is, the user may send the prop sending instruction for the NFT prop to the terminal. Specifically, the non-fungible token prop corresponds to a target prop, and each target prop corresponds to a prop list. The prop list displays the target prop and NFT props corresponding to the target prop.

After receiving the prop sending instruction, the live room terminal may display the NFT prop list of the obtained prop. The NFT prop list lists NFT props corresponding to the obtained prop. For example, for a prop A, an NFT prop sending instruction for the prop A is received, and NFT props (A, A1, A2, A3) corresponding to the prop may be displayed. A is the target prop, A1, A2, and A3 are three NFT props corresponding to the prop A obtained by the user. An arrangement sequence of A1, A2, and A3 may be based on a moment of obtaining the prop, or may be based on rareness of the prop, and the like. This is not limited in this application, and is subject to actual application.

After the prop list is displayed, the user can select an NFT prop that the user expects to display, that is, in the NFT props displayed in the prop list, the user selects the to-be-displayed NFT prop, clicks the to-be-displayed NFT prop, and sends the prop display instruction.

After receiving the prop display instruction, the live room terminal determines the to-be-displayed NFT prop identifier and the live room identifier, adds the to-be-displayed NFT prop identifier and the live room identifier to the prop display instruction, and forward the prop display instruction to the server, so that the server performs subsequent processing based on the prop display instruction.

In still another specific implementation provided in this application, the method further includes:

receiving a prop transfer instruction for a to-be-transferred non-fungible token prop in the prop list; and forwarding the prop transfer instruction to the server, where the prop transfer instruction carries a to-be-transferred prop identifier, a user identifier before transfer, and a user identifier after transfer.

The prop transfer instruction is specifically an instruction that may be used by the user to transfer the NFT prop to another person. In actual application, the user owns an NFT prop. In this case, if the user expects to give the NFT prop to another user, the user may select a to-be-transferred NFT prop from a prop list, send a prop transfer instruction, and writes a user identifier after transfer. For example, Zhang San owns an NFT prop 1, and expects to transfer the NFT prop to Li Si. In this case, Zhang San may display a prop list in an account of Zhang San, select the NFT prop 1 as a to-be-transferred NFT prop, and click a transfer button to enter a user identifier Li Si in a pop-up dialog box. In this case, the to-be-transferred prop identifier (NFT prop 1), the user identifier before transfer (Zhang San), and the user identifier after transfer (Li Si) may be obtained. In this way, a prop transfer instruction is generated, and the prop transfer instruction is sent to the server, so that the server completes NFT prop transfer based on the prop transfer instruction.

The prop processing method based on a live room provided in this application is applied to the live room terminal, and includes: receiving the visual material set and the to-be-displayed visual material identifier set of the target non-fungible token prop, where the to-be-displayed visual material identifier set includes at least one to-be-displayed visual material identifier; determining the to-be-displayed visual material corresponding to each to-be-displayed visual material identifier from the visual material set; synthesizing the target non-fungible token prop based on each to-be-displayed visual material; and displaying the target non-fungible token prop. In the method provided in this application, the live room terminal downloads the visual material set in advance, determines the to-be-displayed visual material set based on the to-be-displayed visual material identifier set, and synthesizes the target NFT prop, so that pressure of the server is reduced. The terminal can synthesize a large quantity of NFT props based on the visual material set. The method is convenient and fast, and resources are saved.

Figure 4:
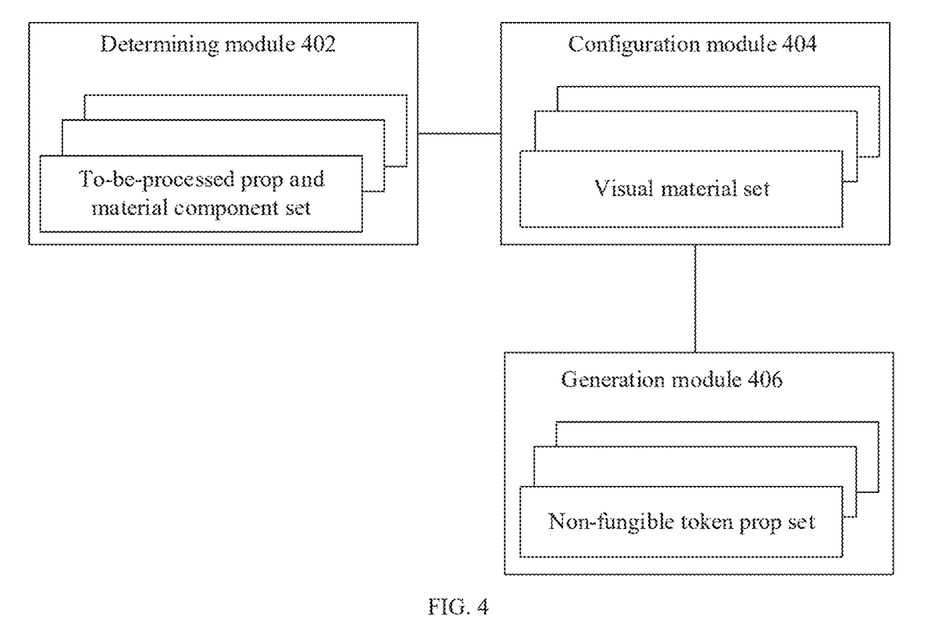
FIG. 4 is a schematic diagram of a structure of a first prop processing apparatus based on a live room according to an embodiment of this application.

Corresponding to the foregoing method embodiments, this application further provides an embodiment of a prop processing apparatus based on a live room. FIG. 4 is a schematic diagram of a structure of a prop processing apparatus based on a live room according to an embodiment of this application. As shown in FIG. 4, the apparatus is applied to a server, and includes:

a determining module 402, configured to determine a to-be-processed prop in a live room and a material component set corresponding to the to-be-processed prop;

a configuration module 404, configured to configure a preset quantity of visual materials for each material component in the material component set to generate a visual material set; and a generation module 406, configured to generate a non-fungible token prop set corresponding to the to-be-processed prop based on a visual material corresponding to each material component.

Optionally, the apparatus further includes:

a creation module, configured to create a non-fungible token prop allocation table, where the non-fungible token prop allocation table is used to record a correspondence between a non-fungible token prop identifier and a user identifier.

Optionally, the apparatus further includes:
a first instruction receiving module, configured to receive a prop obtaining instruction, where the prop obtaining instruction carries a to-be-allocated user identifier;
a set determining module, configured to determine a to-be-allocated prop identifier set from the non-fungible token prop allocation table in response to the prop obtaining instruction, where the to-be-allocated prop identifier includes a non-fungible token prop identifier that is not bound to a user identifier; and
a storage module, configured to: determine a target to-be-allocated prop identifier from the to-be-allocated prop identifier set, and correspondingly store the target to-be-allocated prop identifier and the to-be-allocated user identifier into the non-fungible token prop allocation table.

Optionally, the set determining module is further configured to:
determine a quantity of props corresponding to the to-be-allocated user identifier from the non-fungible token prop allocation table; and
when the quantity of props is less than a preset threshold, execute the operation of determining a to-be-allocated prop identifier set from the non-fungible token prop allocation table in response to the prop obtaining instruction; or
when the quantity of props is greater than or equal to the preset threshold, feed back prompt information indicating that a quantity of non-fungible token props reaches an upper limit.

Optionally, the apparatus further includes:
a second instruction receiving module, configured to receive a prop transfer instruction, where the prop transfer instruction carries a to-be-transferred prop identifier, a user identifier before transfer, and a user identifier after transfer; and
an update module, configured to: when determining that the to-be-transferred prop identifier and the user identifier before transfer are correspondingly stored in the non-fungible token prop allocation table, update the user identifier before transfer to the user identifier after transfer.

Optionally, the apparatus further includes:
a third instruction receiving module, configured to receive a prop display instruction, where the prop display instruction carries a to-be-displayed non-fungible token prop identifier and a live room identifier;
a live room determining module, configured to: determine a to-be-displayed non-fungible token prop based on the to-be-displayed non-fungible token prop identifier, and determine a live room terminal based on the live room identifier; and
a sending module, configured to send the to-be-displayed non-fungible token prop to the live room terminal.

Optionally, the sending module is further configured to:
obtain a to-be-displayed visual material identifier set of the to-be-displayed non-fungible token prop; and
send the to-be-displayed visual material identifier set to the live room terminal.

Optionally, the sending module further comprises:
a duration determining module, configured to determine use duration of the to-be-displayed non-fungible token prop based on the to-be-displayed non-fungible token prop identifier; and
when the use duration is greater than or equal to a preset duration threshold, perform the operation of determining a to-be-displayed non-fungible token prop based on the to-be-displayed non-fungible token prop identifier, and determining a live room terminal based on the live room identifier; or
when the use duration is less than the preset duration threshold, feed back prop display expiration prompt information.

Optionally, the apparatus further includes:
a weight value configuration module, configured to configure a material rareness weight value for the visual material corresponding to each material component; and
a weight value determining module, configured to determine a prop rareness weight value of each non-fungible token prop based on a material rareness weight value of a visual material corresponding to the non-fungible token prop.

The prop processing apparatus based on a live room provided in this application is applied to the server, and includes: determining the to-be-processed prop in the live room and the material component set corresponding to the to-be-processed prop; configuring the preset quantity of visual materials for each material component in the material component set to generate the visual material set; and generating the non-fungible token prop set corresponding to the to-be-processed prop based on the visual material corresponding to each material component. In the apparatus provided in this application, an NFT gift corresponding to a live room gift is added, so that an audience watching livestreaming can have an identity consensus and a value awareness of gift rareness, to improve diversity of giving props in the live room and interaction enthusiasm of the audience. This improves user experience.

The foregoing describes the schematic solution of the prop processing apparatus based on a live room in this embodiment. It should be noted that the technical solution of the prop processing apparatus based on a live room and the technical solution of the foregoing prop processing method based on a live room belong to the same concept. For details not described in detail in the technical solution of the prop processing apparatus based on a live room, refer to the descriptions of the technical solution of the foregoing prop processing method based on a live room.

Figure 5:
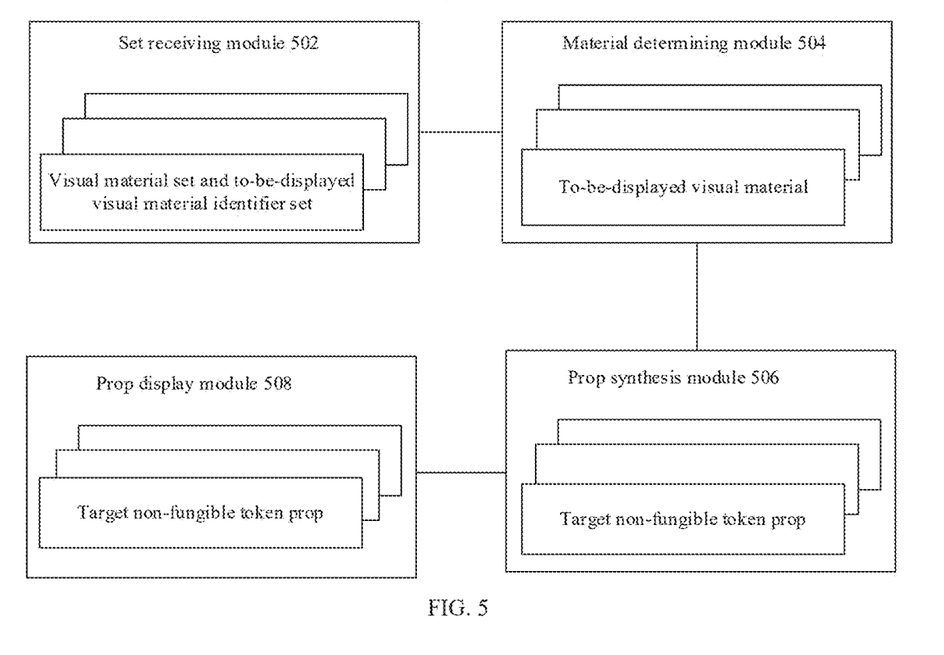
FIG. 5 is a schematic diagram of a structure of a second prop processing apparatus based on a live room according to an embodiment of this application.

Corresponding to the foregoing method embodiments, this application further provides an embodiment of a prop processing apparatus based on a live room. FIG. 5 is a schematic diagram of a structure of a prop processing apparatus based on a live room according to an embodiment of this application. As shown in FIG. 5, the apparatus is applied to a live room terminal, and includes:
a set receiving module 502, configured to receive a visual material set and a to-be-displayed visual material identifier set of a target non-fungible token prop, where the to-be-displayed visual material identifier set includes at least one to-be-displayed visual material identifier;
a material determining module 504, configured to determine a to-be-displayed visual material corresponding to each to-be-displayed visual material identifier from the visual material set;
a prop synthesis module 506, configured to synthesize the target non-fungible token prop based on each to-be-displayed visual material; and
a prop display module 508, configured to display the target non-fungible token prop.

Optionally, the apparatus further includes:
an animation generation module, configured to generate and play a display animation of the target non-fungible token prop.

Optionally, the apparatus further includes:
a first instruction module, configured to receive a gift sending instruction for a target gift in a live room;
a type determining module, configured to determine a prop type based on a preset prop obtaining probability; and
a prop obtaining module, configured to: when the prop type is a non-fungible token prop type, obtain a non-fungible token prop corresponding to a target prop.

Optionally, the apparatus further includes:
a count module, configured to count a quantity of sending times of the target gift; and
a second instruction module, configured to: when the quantity of sending times is greater than a preset quantity threshold, send a prop obtaining instruction for the target non-fungible token prop to a server.

Optionally, the apparatus further includes:
a third instruction module, configured to receive a prop sending instruction for the non-fungible token prop;
a list display module, configured to display a prop list of the non-fungible token prop in response to the prop sending instruction; and
a fourth instruction module, configured to: receive a prop display instruction for a to-be-displayed non-fungible token prop in the prop list, and send the prop sending instruction to a server, where the prop display instruction carries a to-be-displayed non-fungible token prop identifier and a live room identifier.

Optionally, the apparatus further includes:
a fifth instruction module, configured to receive a prop transfer instruction for a to-be-transferred non-fungible token prop in the prop list; and
an instruction forwarding module, configured to forward the prop transfer instruction to the server, where the prop transfer instruction carries a to-be-transferred prop identifier, a user identifier before transfer, and a user identifier after transfer.

The prop processing apparatus based on a live room provided in this application is applied to the live room terminal, and includes: receiving the visual material set and the to-be-displayed visual material identifier set of the target non-fungible token prop, where the to-be-displayed visual material identifier set includes at least one to-be-displayed visual material identifier; determining the to-be-displayed visual material corresponding to each to-be-displayed visual material identifier from the visual material set; synthesizing the target non-fungible token prop based on each to-be-displayed visual material; and displaying the target non-fungible token prop. In the apparatus provided in this application, the live room terminal downloads the visual material set in advance from the live room terminal, determines the to-be-displayed visual material set based on the to-be-displayed visual material identifier set, and synthesizes the target NFT prop, so that pressure of the server is reduced. The terminal can synthesize a large quantity of NFT props based on the visual material set. The method is convenient and fast, and resources are saved.

The foregoing describes the schematic solution of the prop processing apparatus based on a live room in this embodiment. It should be noted that the technical solution of the prop processing apparatus based on a live room and the technical solution of the foregoing prop processing method based on a live room belong to the same concept. For details not described in detail in the technical solution of the prop processing apparatus based on a live room, refer to the descriptions of the technical solution of the foregoing prop processing method based on a live room.

Figure 6:
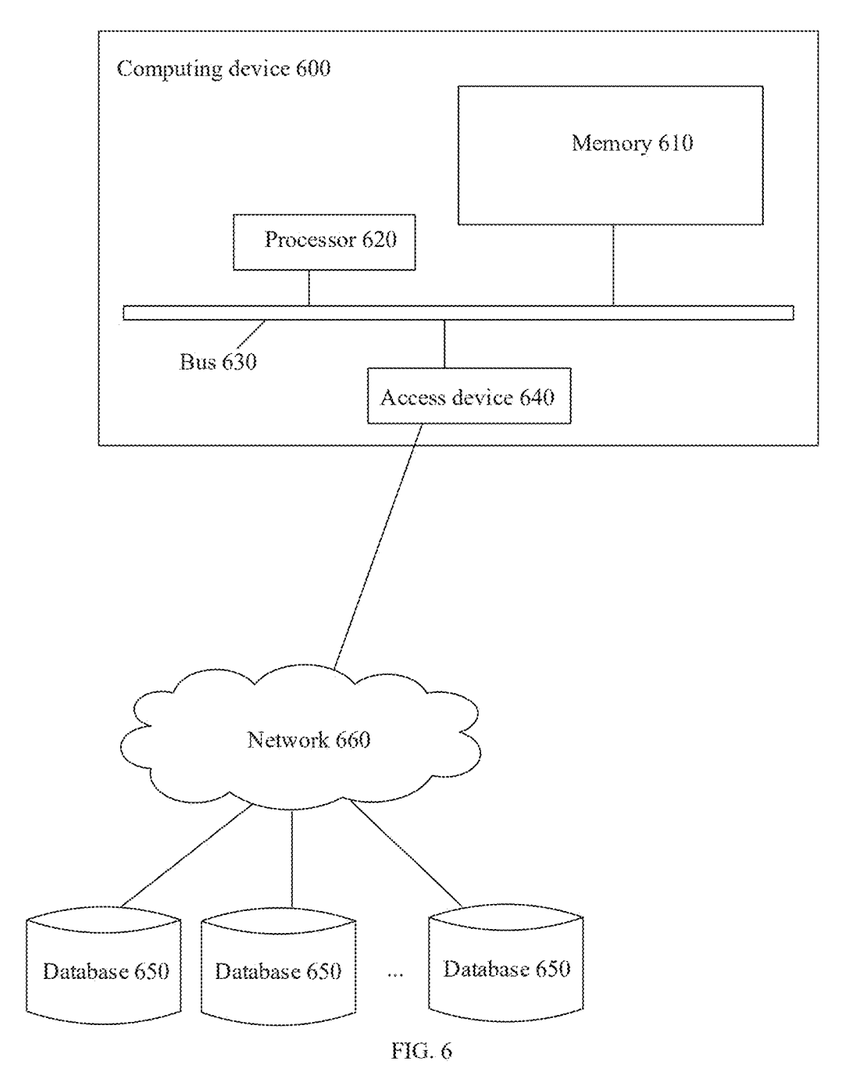
FIG. 6 is a block diagram of a structure of a computing device according to an embodiment of this application.

FIG. 6 is a block diagram of a structure of a computing device 600 according to an embodiment of this application. Components of the computing device 600 include but are not limited to a memory 610 and a processor 620. The processor 620 and the memory 610 are connected by using a bus 630, and a database 650 is configured to store data.

The computing device 600 further includes an access device 640, and the access device 640 enables the computing device 600 to perform communication by using one or more networks 660. Examples of these networks include a public switched telephone network (PSTN), a local area network (LAN), a wide area network (WAN), a private area network (PAN), or a combination of communication networks such as the Internet. The access device 640 may include one or more of any type of network interface (for example, a network interface card (NIC)) that is wired or wireless, for example, an IEEE 802.11 wireless local area network (WLAN) wireless interface, a global microwave interconnection access (Wi-MAX) interface, an Ethernet interface, a universal serial bus (USB) interface, a cellular network interface, a Bluetooth interface, or a near field communication (NFC) interface.

In an embodiment of this application, the foregoing components of the computing device 600 and other components not shown in FIG. 6 may be alternatively connected to each other, for example, by using the bus. It should be understood that the block diagram of the structure of the computing device shown in FIG. 6 is merely used as an example instead of a limitation on the scope of this application. A person skilled in the art may add or replace other components as required.

The computing device 600 may be any type of still or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smartwatch or smart glasses), another type of mobile device, or a still computing device, for example, a desktop computer or a PC. The computing device 600 may alternatively be a mobile or still server.

When executing computer instructions, the processor 620 implements steps of the prop processing method based on a live room.

The foregoing describes the schematic solution of the computing device in this embodiment. It should be noted that the technical solution of the computing device and the technical solution of the foregoing prop processing method based on a live room belong to a same concept. For details not described in detail in the technical solution of the computing device, refer to the descriptions of the technical solution of the foregoing prop processing method based on a live room.

An embodiment of this application further provides a computer-readable storage medium, where the computer-readable storage medium stores computer instructions, and when the computer instructions are executed by a processor, steps of the prop processing method based on a live room are implemented.

The foregoing describes the schematic solution of the computer-readable storage medium in this embodiment. It should be noted that the technical solution of the storage medium and the technical solution of the foregoing prop processing method based on a live room belong to a same concept. For details not described in detail in the technical solution of the storage medium, refer to the descriptions of the technical solution of the foregoing prop processing method based on a live room.

Specific embodiments of this application are described above. Other embodiments fall within the scope of the appended claims. In some cases, the actions or steps recorded in the claims can be performed in an order different from the order in the embodiments and the desired results can still be achieved. In addition, the process depicted in the accompanying drawings does not necessarily require the shown particular order or consecutive order to achieve the desired results. In some implementations, multi-task processing and parallel processing can or may be advantageous.

The computer instructions include computer program code. The computer program code may be in a source code form, an object code form, an executable file form, an intermediate form, or the like. The computer-readable medium may include any entity or apparatus, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, and the like that can carry the computer program code. It should be noted that content included in the computer-readable medium may be appropriately added or deleted according to the demands of legislation and patent practice in a jurisdiction, for example, in some jurisdictions, according to legislation and patent practice, the computer-readable medium includes neither an electrical carrier signal nor a telecommunications signal.

It should be noted that, for ease of description, the foregoing method embodiments are described as a combination of a series of actions. However, a person skilled in the art should understand that this application is not limited to the described action sequence, because according to this application, some steps may be performed in another order or simultaneously. In addition, a person skilled in the art should also understand that the described embodiments in this specification are all preferred embodiments, and the used actions and modules are not necessarily mandatory to this application.

In the foregoing embodiments, descriptions of the embodiments have respective focuses. For a part that is not described in detail in an embodiment, refer to related descriptions in another embodiment.

The preferred embodiments of this application disclosed above are merely intended to help describe this application. In the optional embodiments, all details are not described in detail, and the present invention is not limited to the specific implementations. Clearly, many modifications and changes may be made based on the content of this application. These embodiments are selected and specifically described in this application to better explain the principle and the actual application of this application, so that a person skilled in the art can better understand and use this application. This application is limited only by the claims and the full scope and equivalents thereof.

What is claimed is:

1. A method of generating non-fungible token props to be displayed in live rooms, applied to a server, the method comprising:
    determining a prop associated with one of a plurality of live rooms in which an online streamer performs livestreaming;
    determining a set of material components of the prop;
    generating a set of visual materials based on configuring a plurality of visual materials for each of the set of material components;
    generating a set of non-fungible token props corresponding to the prop based on a plurality of sets of visual materials corresponding to the set of material components, wherein an identifier is assigned to each of the set of non-fungible token props for identification;
    receiving a prop display instruction, wherein the prop display instruction carries an identifier of identifying a non-fungible token prop among the set of non-fungible token props and a live room identifier of identifying a live room where the non-fungible token prop is to be displayed;
    determining use duration associated with the non-fungible token prop based on the identifier of identifying the non-fungible token prop, wherein the use duration indicates a remaining duration of using the non-fungible token prop;
    in response to determining that the use duration is greater than or equal to a preset threshold, determining the non-fungible token prop based on the identifier, and determining the live room based on the live room identifier; and
    in response to determining that the use duration is less than the preset threshold, generating and transmitting a notification indicative of an expiration of the non-fungible token prop.

2. The method according to claim 1, further comprising:
    creating a table indicating an allocation of the set non-fungible token props among users, wherein the table is configured to record corresponding relationships between the set of non-fungible token props and the users, wherein the table comprises non-fungible token prop identifiers and user identifiers.

3. The method according to claim 2, further comprising:
    receiving an instruction of obtaining a non-fungible token prop from a client computing device associated with a user, wherein the instruction carries an identifier of identifying the user;
    determining a subset of non-fungible token props based on the table in response to the instruction, wherein the subset of non-fungible token props has not been allocated to any user; determining a target non-fungible token among the subset of non-fungible token props and allocating the target non-fungible token to the user; and
    storing a corresponding relationship between the target non-fungible token and the user into the table.

4. The method according to claim 3, wherein before the determining a subset of non-fungible token props based on the table in response to the instruction, the method further comprises:
    determining a quantity of non-fungible token props that have been allocated to the user based on the table;
    in response to determining that the quantity of non-fungible token props is less than a preset threshold, determining the subset of non-fungible token props based on table in response to the instruction; and
    in response to determining that the quantity of non-fungible token props is greater than or equal to the preset threshold, generating and transmitting a notification indicating that the quantity of non-fungible token props associated with the user has reached an upper limit.

5. The method according to claim 2, further comprising:
receiving an instruction of transferring a non-fungible token prop among the set of non-fungible token props, wherein the instruction carries an identifier of identifying the non-fungible token prop, a first user identifier of identifying a first user from whom the non-fungible token prop is to be transferred, and a second user identifier of identifying a second user to whom the non-fungible token prop is to be transferred; and
in response to determining that the table stores a corresponding relationship between the non-fungible token prop and the first user, updating the table by reallocating the non-fungible token prop to the second user.

6. The method according to claim 1, further comprising:
sending the non-fungible token prop to client computing devices associated with the live room for display.

7. The method according to claim 6, wherein the sending the non-fungible token prop to client computing devices further comprises:
obtaining a set of visual material identifiers associated with the non-fungible token prop; and
sending the set of visual material identifiers to the client computing devices.

8. The method according to claim 1, further comprising:
configuring a weight value indicative of material rareness for each of the set of visual materials corresponding to each material component; and
determining a weight value indicative of prop rareness for each of the set of non-fungible token props based on the weight value indicative of material rareness for each of the set of visual materials corresponding to each material component.

9. The method according to claim 1, wherein the generating a set of non-fungible token props corresponding to the prop based on a plurality of sets of visual materials corresponding to the set of material components further comprises synthesizing a visual material from each set of visual materials corresponding to each material component into a non-fungible token prop among the set of non-fungible token props.

10. The method according to claim 9, wherein the synthesizing a visual material from each set of visual materials corresponding to each material component into a non-fungible token prop is implemented by the server or a client computing device.

11. The method according to claim 10, wherein an animation of the non-fungible token prop is generated and displayed while displaying the non-fungible token prop on the client computing device.

12. The method according to claim 10, wherein a prop list corresponding to the prop is displayed on the client computing device in response to receiving an instruction of sending a gift prop in a live room, and wherein the prop list comprises the prop and the set of non-fungible token props corresponding to the prop.

13. The method according to claim 1, further comprising:
generating a plurality of sets of non-fungible token props corresponding to a plurality of props.

14. A server computing system of generating non-fungible token props to be displayed in live rooms, comprising:
at least one processor; and
at least one memory communicatively coupled to the at least one processor and comprising computer-readable instructions that upon execution by the at least one processor cause the at least one processor to perform operations comprising:
determining a prop associated with one of a plurality of live rooms in which an online streamer performs livestreaming;
determining a set of material components of the prop;
generating a set of visual materials based on configuring a plurality of visual materials for each of the set of material components;
generating a set of non-fungible token props corresponding to the prop based on a plurality of sets of visual materials corresponding to the set of material components, wherein an identifier is assigned to each of the set of non-fungible token props for identification;
receiving a prop display instruction, wherein the prop display instruction carries an identifier of identifying a non-fungible token prop among the set of non-fungible token props and a live room identifier of identifying a live room where the non-fungible token prop is to be displayed;
determining use duration associated with the non-fungible token prop based on the identifier of identifying the non-fungible token prop, wherein the use duration indicates a remaining duration of using the non-fungible token prop;
in response to determining that the use duration is greater than or equal to a preset threshold, determining the non-fungible token prop based on the identifier, and determining the live room based on the live room identifier; and
in response to determining that the use duration is less than the preset threshold, generating and transmitting a notification indicative of an expiration of the non-fungible token prop.

15. The server computing system according to claim 14, the operations further comprising:
creating a table indicating an allocation of the set non-fungible token props among users, wherein the table is configured to record corresponding relationships between the set of non-fungible token props and the users, wherein the table comprises non-fungible token prop identifiers and user identifiers.

16. The server computing system according to claim 14, the operations further comprising:
receiving a prop display instruction, wherein the prop display instruction carries an identifier of identifying a non-fungible token prop among the set of non-fungible token props and a live room identifier of identifying a live room where the non-fungible token prop is to be displayed;
determining the non-fungible token prop based on the identifier, and determining a live room based on the live room identifier; and
sending the non-fungible token prop to client computing devices associated with the live room for display.

17. The server computing system according to claim 14, wherein the generating a set of non-fungible token props corresponding to the prop based on a plurality of sets of visual materials corresponding to the set of material components further comprises synthesizing a visual material from each set of visual materials corresponding to each material component into a non-fungible token prop among the set of non-fungible token props.

18. A non-transitory computer-readable storage medium, storing computer-readable instructions that upon execution by at least one processor cause the at least one processor to implement operations, the operations comprising:

determining a prop associated with one of a plurality of live rooms in which an online streamer performs livestreaming;

determining a set of material components of the prop;

generating a set of visual materials based on configuring a plurality of visual materials for each of the set of material components;

generating a set of non-fungible token props corresponding to the prop based on a plurality of sets of visual materials corresponding to the set of material components, wherein an identifier is assigned to each of the set of non-fungible token props for identification;

receiving a prop display instruction, wherein the prop display instruction carries an identifier of identifying a non-fungible token prop among the set of non-fungible token props and a live room identifier of identifying a live room where the non-fungible token prop is to be displayed;

determining use duration associated with the non-fungible token prop based on the identifier of identifying the non-fungible token prop, wherein the use duration indicates a remaining duration of using the non-fungible token prop;

in response to determining that the use duration is greater than or equal to a preset threshold, determining the non-fungible token prop based on the identifier, and determining the live room based on the live room identifier; and in response to determining that the use duration is less than the preset threshold, generating and transmitting a notification indicative of an expiration of the non-fungible token prop.

19. The non-transitory computer-readable storage medium according to claim 18, the operations further comprising:

creating a table indicating an allocation of the set non-fungible token props among users, wherein the table is configured to record corresponding relationships between the set of non-fungible token props and the users, wherein the table comprises non-fungible token prop identifiers and user identifiers.

* * * * *